Aug. 7, 1962
E. SCHALLUS ETAL
PROCESS FOR CARRYING OUT ENDOTHERMIC
REACTIONS AT HIGH TEMPERATURES
Original Filed Jan. 10, 1956
Re. 25,218
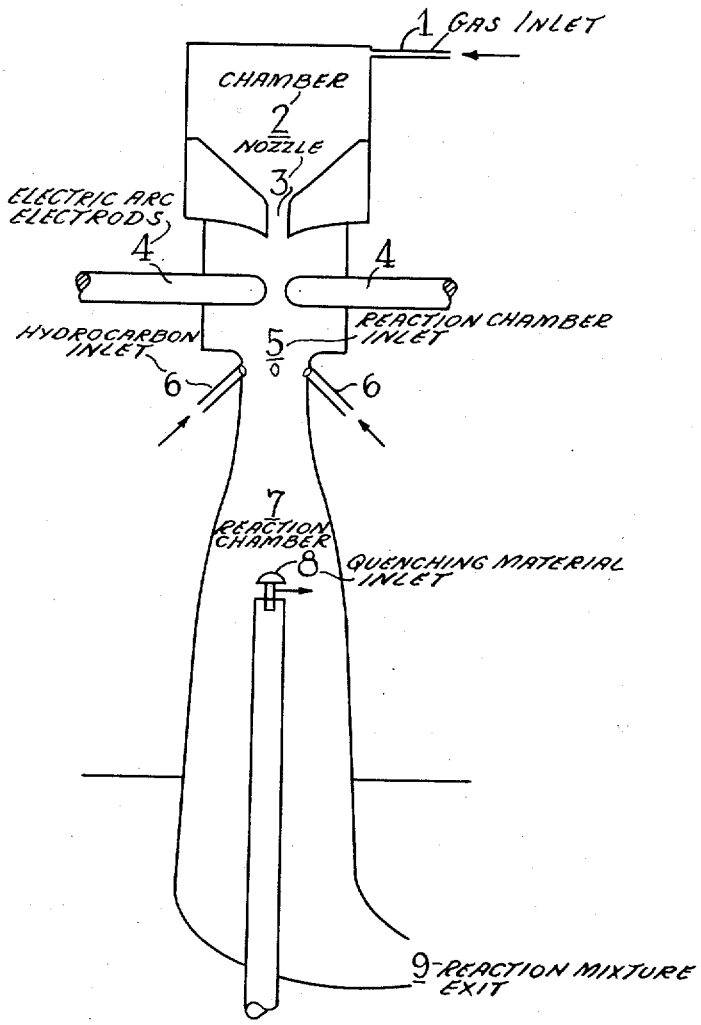
INVENTORS
ERICH SCHALLUS
ARMIN GÖTZ
BY Connolly and Hutz
their ATTORNEYS United States Patent Office Re. 25,21
Reissued Aug. 7, 196

25,218

PROCESS FOR CARRYING OUT ENDOTHERMIC REACTIONS AT HIGH TEMPERATURES

Erich Schallus and Armin Götz, Knapsack, near Koln, Germany, assignors to Knapsack-Griesheim Aktiengesellschaft, Knapsack, near Koln, Germany, a corporation of Germany Original No. 2,916,534, dated Dec. 8, 1959, Ser. No. 558,357, Jan. 10, 1956. Application for reissue Dec. 5, 1960, Ser. No. 73,944
Claims priority, application Germany Jan. 15, 1955
1 Claim. (Cl. 260—679)

Matter enclosed in heavy brackets [ ] appears in the original patent but forms no part of this reissue specification; matter printed in italics indicates the additions made by reissue.

The present invention relates to a process for carrying out endothermic reactions at high temperatures, wherein energy is transferred by a gaseous medium in a manner such that by energy supplied the molecules of the gaseous medium are split into atoms and the energy set free upon recombination of said atoms to molecules is used to effect the endothermic reactions.

There exist, for example, three versions of supplying energy in endothermic reactions at high temperatures, namely:

(a) Transfer of heat from a solid to a gaseous medium, for example, by means of a Cowper stove, a pebble heater, or a coke shaft;

(b) Transfer of heat from a gaseous medium to a gaseous medium, for example, by flame reaction;

(c) Supply of energy by an electric current, for example, with the use of the electric arc method.

Although there are a plurality of processes which have become known for each of these three versions, in some of the typical high temperature reactions only an unsatisfactory energetic effect is attained, and this becomes evident, for example, in the production of acetylene. Some of these processes, for example the production of acetylene from carbon and hydrogen, could not at all be conducted in an economical manner. Thus, for example, reference is made to the process according to Wulff as a version of (a) above. This process involves the drawback of necessitating large storage facilities for pebble heaters, although the hydrocarbons used are only partially converted to acetylene. Besides, a rather great amount of olefins is obtained and, finally, this process is restricted to the use of hydrocarbons containing 1 to 4 carbon atoms.

Processes according to version (b) have also been disclosed in the literature which, however, have the following disadvantages:

The starting material used is only partially reacted; a great amount of olefins is always obtained. Furthermore, practically pure oxygen is necessary to produce the gaseous heating medium, since when using air only insufficiently high temperatures are attained, or a too diluted acetylene gas is formed. Still further, the yield is reduced by secondary reactions of the combustion products which react, among others, with the starting material and the resultant acetylene and form carbon monoxide and hydrogen.

Version (c) is used, for example, in electric arc methods conducted on an industrial scale. If, however, such method is applied to hydrocarbons, their conversion is only about 50 percent. Besides, the separation of the non-reacted hydrocarbon from the hydrogen and the repeated expenditure of energy for once more heating up said non-reacted hydrocarbon involve further expenses. Furthermore, diacetylene and soot are formed and, finally, these processes are restricted to the use of hydrocarbons with a small number of carbon atoms.

Summing up, in the processes mentioned above the r actions must be fairly adapted in each particular ca to the mode of execution. Furthermore, many of the processes could not at all be carried out in an econon cal manner, for example the reaction of hydrocarbo with nitrogen to obtain hydrogen cyanide, or the form tion of acetylene from carbon and hydrogen.

The present invention is based on the observation th the disadvantages involved in the processes known f carrying out endothermic reactions can be prevented l using a process wherein, for the transfer of energy, least one gas, such as hydrogen and/or nitrogen, caused to participate in the reaction by heating it so th part or all its molecules are thermally split into atom the gas so formed—containing free atoms—is caused act outside the heating zone upon the other reactant reactants, and the reacted mixture is chilled. Accordi to the process of this invention the energy set free up recombination of the atoms to molecules is used to car out the endothermic reactions. The term "recombin tion" as used herein means the re-formation of neutr molecules from atoms.

For the reaction according to this invention, it is n necessary that the consumption of the gas split into aton be visible, though this is often the case. In many cas it suffices to use a gaseous medium which shifts th equilibrium of the endothermic reactions in the directic of the reaction course desired, without the participatic of this medium in the reaction being detectable in th composition of the individual reaction products forme Thus, for example, in the manufacture of acetylene fro hydrocarbons, it is particularly advantageous to use gaseous medium which favorably influences the form tion of acetylene and hinders the formation of soo Due to the presence of the hydrogen required for th supply of energy, it is even possible to prevent the form tion of soot practically completely.

According to this invention endothermic reactions ca be conducted with particular advantage using hydroge and/or nitrogen as gases which transfer the energy. Suc reactions are, for example, the preparation of unsatu rated organic compounds which, on the one hand, cor tain at least one triple bond and at most 2 carbon atom and, on the other hand, contain at most two atoms c at least one element selected from the group consistin of hydrogen and nitrogen, such as acetylene ($HC{\equiv}CH$) hydrogen cyanide ($H{-}C{\equiv}N$), and dicyane ($C{\equiv}N$). It is also possible to a small extent to produce ethylene For the production of the aforesaid unsaturated organi compounds from hydrocarbons or carbon, on the on hand, and hydrogen and/or nitrogen, on the other hand generally about 0.05 to about 2 mols of hydrogen and/o nitrogen are used per 1 gram atom of carbon containe in the starting material. If hydrocarbons are used a starting material for the manufacture of products con taining hydrogen, it is preferable to use about 0.1 t about 1 mol of hydrogen or nitrogen per 1 gram atom o carbon contained in the hydrocarbon. If a pulverize carbon-containing material, for example coal or coke i used as starting material, it is advisable to use greate amounts of the gas, i.e. between 0.2 and 2 mols of hydro gen and/or 0.2 to 2 mols of nitrogen per 1 gram atom o carbon contained in the starting material used. Suc carbon-content is about equal to the weight of the resi due which is obtained after the carbon-containing start ing material has been degassed. To this end, it is possible to use both degassed or undergassed coal. It is, however advisable to use a coal which has almost been freed from humidity by drying it, for example, at a temperature o 110 to 130° C.

It is particularly advantageous to use equi-atomic quans, i.e. to use 1 gram atom of hydrogen and/or 1 n atom of nitrogen per 1 gram atom of carbon.

.s starting materials containing carbon there can be l, for instance, saturated or unsaturated hydrocar- s containing up to 30 or more carbon atoms or pulver- . carbon. The term "carbon" as used herein means kinds of carbon or coal such as lignite, coal, coke ob- ed from coal or lignite, or charcoal. It is particu- y advantageous to use saturated hydrocarbons, such nethane, ethane, propane, butane, pentane, heptane, ıne, decane or dodecane, especially in the form of usual liquid technical or commercial mixtures, for mple in the form of hydrocarbon oils. If high-boil- oils or hydrocarbons containing, for instance, up to 30 ɔon atoms are used, the hydrogen and/or nitrogen can caused to act upon the liquid oils or liquid hydro- ɔons, especially when these liquid compounds partici- : in the reaction in a finely divided form, for example a spray. To this end, it is advisable to admix the ly dispersed liquid substances to the current of the ılly or partially dissociated gas. Generally, it is, how- r, more suitable to vaporize the hydrocarbons prior he reaction.

nstead of aliphatic saturated hydrocarbons containing ween 1 to about 30 carbon atoms or more, there can ı be used unsaturated and/or branched hydrocarbons. branched hydrocarbons there come into considera- ı, for example, isobutane, isooctane, isoheptane etc. unsaturated hydrocarbons there can be used with ad- tage, for example, ethylene, propylene, butylene and ɔutylene. It is, however, also possible to use natural :tures of hydrocarbons of natural origin or those ob- ıed in industry; for example topped Kuwait oil may used.

n the process of this invention hydrogen and/or nitro- ı is used for the transfer of energy in a manner such t, by the supply of energy, the molecules of these es are split into atoms and the energy set free upon recombination of the atoms is used, outside the heat- zone, to effect and to feed the endothermic reaction, for endothermically splitting the hydrocarbons or car- ı bonds into carbon and for the formation of acetylene l/or hydrogen cyanide. In many cases, the aforesaid es participate in the reaction.

The process according to this invention is particularly table for use in the production of acetylene. In this e the reaction proceeds as follows: hot hydrogen the lecules of which are partially or totally dissociated ɔ atoms is caused to act upon carbon or, advantage- ıly hydrocarbons, for instance, such as have been men- ıed above. Contrary thereto, when solid carbon is re- ed with nitrogen, dicyane can be obtained. If, how- r, solid carbon is treated with a mixture of partially totally dissociated hydrogen and nitrogen, or—more vantageously—hydrocarbons, for instance those men- ıed above, are treated with hot nitrogen which has at st partially been split into atoms, it is possible to pro- :e hydrogen cyanide. In the production of hydrogen ınide from nitrogen and aliphatic saturated hydro- bons, it is possible to use, as hydrocarbon, for exam- , propane, for example 0.1 to 1 mol, especially 0.7 0.6 mol of propane, per 1 mol of nitrogen.

Instead of hydrocarbons or carbon there may be used carbon-containing starting materials for the process :ording to the invention aliphatic amines such as methyl ine, ethyl amine, propyl amine, butyl amine, lauryl ıine, oleyl amine, ethylene-diamine, trimethylamine, di- thylamine, tetramethylendiamine, hexamethylendia- n etc. When using these substances as carbon-contain- ; starting material, the same amounts of hydrogen l/or nitrogen as stated above may be used, and hydro- ı cyanide or mixtures thereof with acetylene may be tained.

The chilling of the reaction mixture, generally, is per- :med in a manner such that a liquid which practically does not react with the reacting or reacted components is injected into the reacted mixture. Water can, for example, be used as such liquid.

According to the process of this invention the heat necessary to perform endothermic reactions is produced by the energy set free upon recombination of the gas atoms to molecules. For instance, use is made of the heat of reaction of the following reactions:

$$H+H \rightleftarrows H_2+100 \text{ Kcal.}$$

or $$N+N \rightleftarrows N_2+110 \text{ Kcal.}$$

for carrying out endothermic chemical high-temperature processes. To attain a high concentration of energy in the reaction zone, the molecules are previously dissociated into atoms and recombined in the reaction chamber.

An apparatus suitable for use in carrying out the process of this invention is illustrated diagrammatically in the accompanying drawing.

It should be noted that the whole apparatus as well as the feed pipes are made of or lined with refractory material, for example carbon, chamotte tiles, dynamidon tiles, chalk-dinas tiles or magnesium silicate tiles.

In the drawing the numerals designate the following parts: Through pipe 1 the gas to be activated which advantageously has been preheated to a temperature of about 1000° C. enters the chamber 2 in which an angular momentum is imparted to the gas to be dissociated and then passes through a nozzle like aperture 3 into an electric arc 4 formed between two carbon or metal electrodes or into another source of energy, for example a high frequency discharge, a glow discharge, or a quiet electric discharge, where the gas is split into atoms. Since the lifetime of these atoms is only within the order of about 0.1 to 1 second, which depends on the fact that the re-unification of the atoms to the molecule can only be performed by a triple collision, the gas passing through the source of energy is required to have a high rate of speed.

It is, therefore, advisable that the minimum velocity rate of the gas be above 400 meters per second, preferably more than 1000 meters per second. The electrodes consist, for example, of tungsten or carbon and the electric arc is for instance charged with about 35 kw. After the atomic gas has left the source of energy 4 it passes through a further contracted aperture 5 where it contacts the substance to be reacted with the atomic gas. It is advisable to preheat this substance, preferably to a temperature of about 1000° C., it is then passed through conduit 6 to point 5. In the reaction chamber 7 which is somewhat conically enlarged in downward direction the reaction between the two components sets in after the most favorable temperature for the optimum conversion has been adjusted by the temperature of the preheated gases and a suitable choice of the corresponding current intensity and tension of the electric arc. At the same time, a chilling agent, for example water, is sprayed through the nozzle-like distributor 8, so that the reacted mixture which escapes at 9 is fairly rapidly cooled, for instance, to a temperature of about 100° C. If it is desired to react solid substances with the atomic gases, these substances are blown in finely divided form, for instance as dust, into the reaction chamber through conduit 6 by means of a current of preferably non-atomic gases of equal kind.

Having regard to the medium lifetime of the atoms and the high velocity of the gas, it is evident that several meters behind the electric arc recombination of the atoms to molecules has not yet taken place. This zone which contains the free atoms and which is outside the electric arc is suitable for carrying out endothermic reactions. If, for example, hydrocarbons regardless of the size of the molecules are introduced into this zone the following takes place:

The recombination of the hydrogen atoms to molecules takes place directly at the place the hydrocarbons are introduced. Therefore, the energy is set free in the midst of the reaction agglomerate and directly at a part of the hydyrocarbon molecule. The molecule of the hydrocarbon is split into small particles which form acetylene due to the presence of hydrogen, without soot or higher acetylenes such as diacetylene being formed. A further advantage of the process according to this invention resides in the fact that it is not necessary to put up with an incomplete conversion of the hydrocarbon in favor of the yield of acetylene.

As compared with the known processes, the process of this invention provides a better utilization of the hydrocarbon used as starting material and is not dependent on the use of hydrocarbons having a certain size of the molecules; furthermore, much lower costs are involved in concentrating the acetylene due to the absence of soot and diacetylene; no separation of methane from hydrogen and less expenditure of electric energy are necessary.

If the endothermic reactions are performed in an electric arc, these reactions do not show an optimum result since the electric arc consists of zones having different temperatures. The zones at the border are colder than the middle zones. Contrary thereto, according to this invention, the reaction is not achieved in the electric arc but only outside the heating zone, that is to say in an exactly delimited and specifically adjustable zone of temperature which allows of obtaining optimum conversions.

The normal electric arc methods practically must be considered to be endothermic reactions. This means that in the production of acetylene from hydrocarbons or in the production of hydrogen cyanide from hydrocarbons and nitrogen according to the known processes the electric energy is converted to heat energy in the presence of the hydrocarbon, or hydrocarbon and nitrogen, respectively. Prior to this invention it was impossible to convert electric energy to thermal energy and at the same time perform the endothermic reaction with the best possible effect. In the production of hydrogen cyanide it must also be observed that the temperatures required to sensitize nitrogen and hydrocarbons are far different.

By the process of this invention, all the disadvantages inherent to the known processes are avoided as disclosed above. For producing hydrogen cyanide from hydrocarbons, generally only nitrogen is passed through the electric arc. In the production of acetylene from the elements which hitherto has been impossible on an industrial scale since coal dust and hydrogen cannot be passed continuously through the electric arc, powdered carbon is reacted with atomic hydrogen.

The following examples illustrate the invention. The conversion is performed in an apparatus as described above in which carbon has been used as highly refractory material. For all the examples herein the same apparatus was used and unless otherwise stated the conversions were conducted under the same reaction conditions.

EXAMPLE 1

Through the opening 1 of an arc furnace of 35 kw. 4 m.$^3$ per hour of hydrogen, suitably preheated to 1000° C., are introduced in a tangential manner into chamber 2 in which an angular momentum is imparted to the hydrogen. From said chamber the hydrogen passes through the nozzle 3 and enters the electric arc burning between the electrodes 4. The nozzle is suitably measured so that the hydrogen enters the area of the electric arc at a rate of at least 400 m./sec., preferably about 1000 m./sec. After having left the electric arc, the now atomic hydrogen, at 5, strikes propane which is introduced at 6 at a rate of 4 m.$^3$ per hour and has suitably been preheated to about 1000° C. In the reaction chamber 7 a temperature of 1200 to about 1600° C. prevails, which temperature is the most favorable one for the optimum conversion. The reaction products are immediately cooled to about 100° C. by means of wa introduced through nozzle-like distributor 8 at a rate about 100 liters per hour. Of the carbon used in form of propane there are obtained: 85 percent in form of acetylene; 5.3 percent in the form of propyle 8 percent in the form of ethylene; 1.7 percent in the fo of methane. No formation of higher acetylenes or s takes place.

EXAMPLE 2

The process is carried out in the apparatus and un the conditions described in Example 1 with the exc tion, however, that, instead of propane, there are int duced, per hour, about 5 kilograms of a topped oil Kuwait origin (boiling at a temperature between and 340° C.) in the form of vapor and having a te perature of about 500° C.

Of the carbon used there are obtained: 78 percent the form of acetylene; 5.1 percent in the form of p pylene; 13.3 percent in the form of ethylene; 3.2 perc in the form of methane. In this case also no soo formed.

EXAMPLE 3

The process is carried out in the apparatus and un the same conditions as described in Example 1, with exception, however, that instead of propane there introduced, per hour, 4 kilograms of dodecane in form of vapor and having a temperature of about 5 C. There are obtained in the form of acetylene ab 80 percent of the carbon contained in the dodecane.

EXAMPLE 4

The process is carried out in the same apparatus under the same conditions as described in Exampl with the exception, however, that instead of prop there are introduced, per hour and behind the elec arc, 1.5 kilograms of most finely pulverized lignite pended in hydrogen which is blown in in an amoun about 2 cubic meters per hour and which has been heated to a temperature of about 1000° C. The hy gen freed from the unreacted lignite dust contains to about 18 percent by volume of acetylene.

EXAMPLE 5

The process is carried out under the same conditi as described in Example 1 with the exception, howe that instead of hydrogen, there are passed through electric arc per hour 5 cubic meters of nitrogen heated to a temperature of 1000° C. and split in electric arc into atoms. The propane introduced a is used in a quantity of 3 cubic meters per hour. Tl are obtained in the form of hydrogen cyanide about percent of the carbon used in the form of propane 15 percent of the carbon used are obtained in the f of acetylene. The remainder consists almost comple of methane.

We claim:

The process of preparing extremely high yields of unsaturated organic compound containing at least triple bond and at most two carbon atoms and consis of carbon and at most two atoms of at least one elen selected from the group consisting of hydrogen and ni gen, said process comprising the steps of thermally sociating the molecules of a gas selected from the gr consisting of hydrogen, nitrogen, and mixtures thereof atoms by passage in direct contact with an electric admixing thermally dissociated gas with a carbon-cont ing substance selected from the group consisting of fi divided carbon, aliphatic amines and hydrocarb [within] *up to* a time of [from] about [0.1 to ab 1.0 second from the time of dissociation and in a removed from said electric arc, the ratio of therm dissociated gas to selected substance being from al to about 2.0 mols of dissociated gas per gram atom of on in said selected substance, the flow rate of ther- ly dissociated gas from the electric arc to the zone re- ed from the electric arc being at least about 400 ers per second, the heat liberated by reassociation of thermally dissociated atoms causing an endothermic tion and forming said unsaturated organic compound, immediately thereafter rapidly cooling the resulting tion mixture.

References Cited in the file of this patent or the original patent

UNITED STATES PATENTS

| | | |
|---|---|---|
| 2,167,471 | Auerbach | July 25, 1939 |
| 2,858,261 | Pevere et al. | Oct. 28, 1958 |

OTHER REFERENCES

Ephraim: "Inorganic Chemistry," 5th edition, Interscience Publ., N.Y. (1949), page 119.